United States Patent [19]
Best

[11] Patent Number: 5,230,161
[45] Date of Patent: Jul. 27, 1993

[54] APPARATUS AND PROCESS FOR GENERATING RADIANT ENERGY

[75] Inventor: Willie H. Best, Columbia, S.C.

[73] Assignee: Haden Schweitzer Corporation, Madison Heights, Mich.

[21] Appl. No.: 702,109

[22] Filed: May 15, 1991

Related U.S. Application Data

[63] Continuation of Ser. No. 329,891, Mar. 28, 1989, abandoned.

[51] Int. Cl.⁵ .............................................. F26B 3/30
[52] U.S. Cl. .......................................... 34/1 X; 34/39
[58] Field of Search ................. 126/92 AC; 34/39, 40, 34/41, 1; 432/174, 209, 147

[56] References Cited

U.S. PATENT DOCUMENTS

| | | | |
|---|---|---|---|
| 233,389 | 10/1880 | Adams | 126/92 C |
| 1,606,255 | 11/1926 | Mettler | 126/92 C |
| 4,531,508 | 7/1985 | Niknejad et al. | 126/92 C X |
| 4,761,894 | 9/1988 | Hamasaki et al. | 432/209 |

FOREIGN PATENT DOCUMENTS

| | | | |
|---|---|---|---|
| 1038813 | 10/1953 | France | 34/39 |
| 1027502 | 12/1953 | France | 34/4 |

Primary Examiner—Henry A. Bennet
Attorney, Agent, or Firm—Hopkins & Thomas

[57] ABSTRACT

A radiant wall structure including a radiant emitting wall and a second wall spaced from the radiant emitting wall to define a combustion chamber therebetween. A line burner is positioned in the combustion chamber and delivers heated gases upwardly through the combustion chamber. The distance between the radiant emitting wall and the second wall is selectively varied to vary the velocity of the heated gases passing through the combustion chamber, to thereby selectively control the energy transferred to the radiant emitting wall.

41 Claims, 9 Drawing Sheets

APPARATUS AND PROCESS FOR GENERATING RADIANT ENERGY

This is a continuation of copending application Ser. No. 07/329,891 filed on Mar. 28, 1989, now abandoned.

BACKGROUND OF THE INVENTION

1. Field of the Invention

This invention relates to an apparatus and process for generating radiant energy, and is more particularly concerned with a radiant wall structure employed in an industrial oven. The structure includes a radiant wall, the temperature profile of which can be varied along selected areas, by increasing or decreasing the velocity of heated gases passing through a combustion chamber.

2. Description of the Prior Art

Various means have been utilized in the past to generate radiant energy for use, for example, in industrial ovens to cure coatings. In the conventional design of heated air ovens, it has been a common practice to provide the heated air for the oven from an external heater house containing a burner, and which utilized a fan to recirculate the heated air to and from the oven. These heater houses were interconnected to the oven with supply and return air ducts. When incinerators are used in conjunction with conventional ovens to oxidize the volatile organic compounds (VOC's) which are generated in the drying (curing) process, the incinerators are also interconnected to the ovens with external air ducts. In most instances, these ducts to and from the heater houses and/or the incinerator must be insulated. This duct work and the heater houses or incinerators occupy valuable space within the manufacturing facility. The external heater houses and associated duct work increase the mass of the oven that must be heated on each heat-up cycle of the oven. This increases the time from when the oven is started to when it is ready for use. On each cycle of the oven, the energy that is consumed in heating the mass of the oven is lost to the environment during the period the oven cools down. The external duct work and heater houses also increase the exposed surface area of the oven, therefore increasing the transmission losses. Not only is this lost energy costly, but often this necessitates the operation of additional, costly air conditioning apparatus to remove this wasted heat from the work environment.

In many applications of ovens using external heater houses, the recirculating fans operate at a high level of noise, which adversely impacts the working environment. The recirculating fans used in the external heater houses require extensive maintenance and consume large quantities of energy. It is common for each recirculating fan in large oven installations, such as those used in the automotive and truck industry, to require fan motors of 25 horsepower and larger. In a large installation of conventional ovens using heater houses, a typical cost of electric energy to drive the recirculating fans is estimated to be in excess of approximately $500.00 per day, or more than approximately $100,000.00 per year. The recirculating fans and the inherent disadvantage of their use is eliminated by the present invention. Also, all external or remote heater houses and associated duct work is eliminated by the structure disclose herein.

A means for generating radiant energy is disclosed in my U.S. Pat. No. 4,546,553, for a Radiant Wall Oven and Process of Drying Coated Objects. This oven generates radiant energy by igniting a combustible fuel mixture behind the radiant wall, and employing a series of propeller fans to direct the heated gases within a chamber against the radiant wall. The heated gases within the chamber are in a turbulent condition, and therefore, the radiant wall is heated substantially uniformly throughout its entire surface area. While this oven provides an efficient and reliable means for drying coated objects, it is practically impossible to selectively vary the radiant energy emitted by different portions of the wall. Further, the fans which direct the heated gases against the radiant wall have many of the inherent disadvantages previously discussed.

In my U.S. Pat. No. 4,785,552 for a Convection Stabilized Radiant Oven, I disclose an oven in which radiant emitter walls emit radiant energy within a drying chamber, accomplishing highly efficient heat transfer by infra-red radiation. Overhead fans circulate the air within the drying chamber to control the equilibrium temperature of the surface of the object in the oven, and to minimize the variation of the temperature distribution in the oven. To generate the radiant energy, a separate furnace utilizing a gas burner assembly is disposed adjacent to the oven. Blowers force heated gas from the furnace through ducts and into outer plenum cavities. The heated gas is directed under pressure through nozzles, and impinges on the inner surface of a radiant emitter wall. While the temperature of the entire radiant emitter wall can be selectively controlled, there is no means to controlled the radiant energy emitted by selected portions of the wall. Further, the separate furnace and its associated duct work and fans also necessarily incorporate the disadvantages previously discussed.

SUMMARY OF THE INVENTION

Briefly described, the present invention includes an apparatus, namely a radiant wall structure having a pair of spaced walls forming a combustion chamber between their respective inner sides. The first wall or radiant emitter wall is curvilinear, being concave along its outer side and curving about a horizontal axis. The outer side of the radiant emitter wall (radiant wall) is preferably coated with a high emissivity material. The second wall is also curvilinear, and is spaced from the inner side of the radiant wall, at various distances along their respective vertical dimensions or increments. The combustion chamber formed between the radiant wall and the second wall is further defined by a bottom wall and upstanding side walls. A longitudinally extending exhaust duct is disposed along the top of the walls, defining an exhaust aperture. Disposed on the bottom wall along the length of the combustion chamber is a line burner, which ignites a combustible fuel mixture and delivers heated gases upwardly between the spaced walls. The heated gas impinging on the radiant wall, transfers energy to the radiant wall in the form of heat. Since this energy is partially dependent upon the velocity of the heated gases contacting the wall, by varying the velocity of the gases contacting various increments of the radiant wall, the energy transferred to that increment of the wall can be selectively controlled. The radiant energy emitted from the radiant wall can therefore, likewise, be controlled in this manner.

The velocity of the heated gases contacting the radiant wall is controlled by incrementally varying the distance between the first and second walls, thereby changing the cross-sectional area of the combustion chamber. The energy transferred to the radiant wall can also be controlled by altering the vertical and horizontal position of the burner within the combustion chamber, and by the inclusion of baffles or vanes within the combustion chamber. The radiant energy emitted by the radiant wall can be varied using cascade plates mounted to the outer side of the emitter wall. An exhaust fan communicating with the exhaust aperture removes the heated exhaust gases from the upper portion of the combustion chamber.

The radiant wall directs radiant energy toward a vertical plane spaced outwardly from and running the length of the radiant wall. Using the above-described invention, the radiant energy emitted along the vertical dimension of the radiant wall can be selectively controlled. No fans, external heater houses or duct work are needed to deliver the energy to the radiant wall, only an exhaust fan is used to remove gases. Another advantage of the oven of this invention is that the shape of the emitter wall can be changed to accommodate the processed object. As an example, there are usually heavier members in the floor of a truck or automobile body than in the side walls and the emitting wall can be extended in the direction of the center line of the oven at the bottom to concentrate additional energy on the heavier members. Also on the lower portion, a more curved wall (shorter radius) toward the center line of the oven can be used in combination with the burner location to concentrate the radiation intensity around and under the processed object such as a truck or automobile body.

In another embodiment, an aperture is provided in the lower portion of the radiant wall to allow the air in front of the radiant wall to be drawn by the exhaust fan into the lower portion of the combustion chamber. In this area, any VOC's in the air are incinerated, and the products of incineration are exhausted. While incineration of the exhaust gases is desirable in some applications, it should be understood that the majority of the VOC's expelled during the coatings process does not occur in the ovens. Most of the VOC's evaporate during the spraying of the coatings and while the coatings are allowed flash time prior to entering the oven. Previous investigations have revealed that less than 10% of the VOC's are evaporated in the oven. However, because of the misconception that most of the VOC's are discharged into the oven, most ovens are over-exhausted. This practice contributes greatly to the waste of energy. When too much exhaust is used and incineration is required, the energy required for the incineration can exceed the required energy of the oven. Unless there is another use for this excess energy, it is lost to the atmosphere. In order for all VOC's to be oxidized, they must reach their 'auto' ignition temperature. Most VOC's will oxidize at about 1250° F. at a dwell time of 7/10's seconds. However, in order to be sure that all of the VOC's are oxidized, incineration temperatures up to 1450° F. are used.

The oven of this invention can incinerate a normal exhaust rate for most coatings operation without a sacrifice in efficiency. Tests and studies by me have shown that the oven of this invention can incinerate exhaust rates up to 30 SCFM per foot of oven for most coatings applications. Higher exhaust rates can be accommodated if the heat load to the oven exceeds about 33,000 Btu/Hr./Ft. of oven. However, if the exhaust rate is increased to the point where the energy required for incineration exceeds the energy input of the oven, then the excess energy has to be discharged from the oven. Just as when a conventional incinerator is used, this excess energy can be used in other processes, but a means has to be provided to expel this energy from the oven or the oven would overheat beyond its control temperature. The simplest method to deal with this problem with the oven of this invention is to increase the distance between the radiant wall and the second, exterior wall. This lowers the velocity of the gases and allows them to be discharged at a higher temperature. In other words, the efficiency of the heat transfer system is deliberately decreased to deal with the excess energy due to incineration of excess exhaust rates. Other methods of dealing with this problem would involve a means such as a separate exhaust duct communicating with the combustion chamber, to bleed the exhaust gases out of the combustion chamber after incineration has occurred. If the radiant wall temperature reached an overheated condition, a blower attached to the separate exhaust duct would bleed more of the exhaust gases from the combustion chamber, therefore decreasing the amount of energy to be given up to the radiant wall.

In most applications, the energy required for incineration of the exhaust will be less than the required energy of the oven and the incineration is accomplished as a by-product of the basic heating system of the oven with little or no increase in the cost of energy and very little increase in the cost of the equipment. In conventional systems, the incinerator is a separate piece of capital equipment that is in addition to the cost of the oven. It would not be uncommon for incineration and associated duct work and equipment to add more than $400 in cost per foot of oven to ovens with exhaust gas incineration.

In another embodiment, the radiant wall structure is incorporated into an oven housing so that a heating chamber exists between the second wall and the respective oven housing side wall. An exhaust port defined by a duct passing transversely through the combustion chamber exhaust duct, permits air from in front of the radiant wall to pass into the heating chamber. This air passes downwardly through the heating chamber where it is heated by convection from the second wall. The air then passes through an aperture in the bottom wall of the heating chamber and then into lower portion of the combustion chamber. Any VOC's contained in this air are incinerated by the burner in the combustion chamber, and the products of combustion are then exhausted.

In another embodiment, a fresh air duct extends downwardly within the heating chamber, then passes through the second wall and the radiant wall, and terminates defining an open port in the area in front of the radiant wall, or the drying chamber. A fresh air inlet defined along the bottom of the oven housing side wall permits fresh air to enter the heating chamber, where the fresh air is drawn upwardly through the heating chamber and preheated. The heated air is then forced downwardly through the fresh air duct in the heating chamber, and into the drying chamber, outwardly from the bottom portion of the radiant wall, to add preheated make-up air to the drying chamber.

In another embodiment, while exhaust gases from the drying chamber are circulated through an exhaust gas heating chamber and into the combustion chamber for incineration, fresh make-up air is simultaneously forced through a fresh air duct running downwardly through a fresh air heating chamber and into the drying chamber.

Both fresh air and exhaust gases are simultaneously preheated in this manner, while being segregated to avoid contamination of the fresh make-up air.

In still another embodiment, a radiant wall structure is installed in an existing, conventional industrial oven in order to convert only a portion of the oven to include a radiant zone. In many applications of convection ovens, it is desirable to convert a portion of the oven to a radiant zone. In recent years, increased importance has been placed on the quality of the finish on automobiles and trucks. A major contributing factor in improved paint quality is the elimination of dirt or foreign particles in the cured coating. It has been established that the dirt and foreign particles in coatings can be greatly reduced or eliminated by not exposing the wet coating to an environment in which there is forced air movement. Therefore it is desirable and widely practiced to set the coating to a tack-free condition in a radiant zone before the object is introduced to a heat transfer process involving forced air movement.

Accordingly, it is an object of the present invention to provide an apparatus for generating radiant energy which is efficient in operation, easily maintained, inexpensive to manufacture, and durable in structure.

Another object of the present invention is to provide an apparatus for generating energy, in which energy is transferred to a radiant wall by directing heated gases against the radiant wall, and where the energy transferred is controlled by controlling the velocity of the heated gases by selectively altering the cross-sectional area of a combustion chamber.

Another object of the present invention is to provide a radiant wall structure in which the temperatures on the radiant wall can be varied in the vertical dimension of the wall to improve uniformity in the radiant flux density at the processed object location in an oven, and/or to provide concentrated radiant energy at a desired elevation of the oven.

Another object of the present invention is to provide a radiant wall structure in which the temperature of the wall in horizontal dimension of structure oven can be varied.

Another object of the present invention is to provide a radiant wall structure that eliminates the requirement of all exterior heater houses, recirculation fans, and external recirculation ducts in an oven.

Another object of the present invention is to provide a radiant wall structure in which the combustion of the gas for the release of the energy, and all heat transfers modes, occurs in the confines of the structure's exterior surfaces.

Another object of the present invention is to provide an oven that operates with a much reduced sound level.

Another object of the present invention is to provide an oven at a reduced cost.

Another object of the present invention is to provide an oven capable of self-contained incineration.

Another object of the present invention is to provide a radiant wall structure that can be used to easily convert a portion of or all of a conventional oven to a radiant-wall type of oven.

Another object of the present invention is to provide an oven that requires much less maintenance by the elimination of large centrifugal recirculation fans.

Another object of the present invention is to provide an oven that will operate with greatly reduced electrical energy requirements as compared to conventional ovens.

Another object of the present invention is to provide an oven that can be built in a single, self-contained modules.

Another object of the present invention is to provide an oven in which the mass of steel and insulating material is greatly reduced.

Another object of the present invention is to provide an oven with a fast heat-up rate.

Another object of the present invention is to provide an oven that will be capable of expelling excess heat energy due to incineration, when the energy for incineration exceeds the energy requirement of the oven.

Another object of the present invention is to provide a radiant wall structure in which the shape of the curved radiant wall can be designed in combination with the burner location to concentrate energy under a vehicle or other processed object.

Another object of the present invention is to provide a radiant wall structure of which the basic design is flexible, and with rather minor changes allows the exhaust gases to be preheated before incineration and/or fresh make-up air to be preheated.

Other objects, features and advantages of the present invention will become apparent from the following description when taken in conjunction with the accompanying drawings wherein like characters of reference designate corresponding parts through the several views.

DESCRIPTION OF THE PREFERRED EMBODIMENTS

Figure 1:
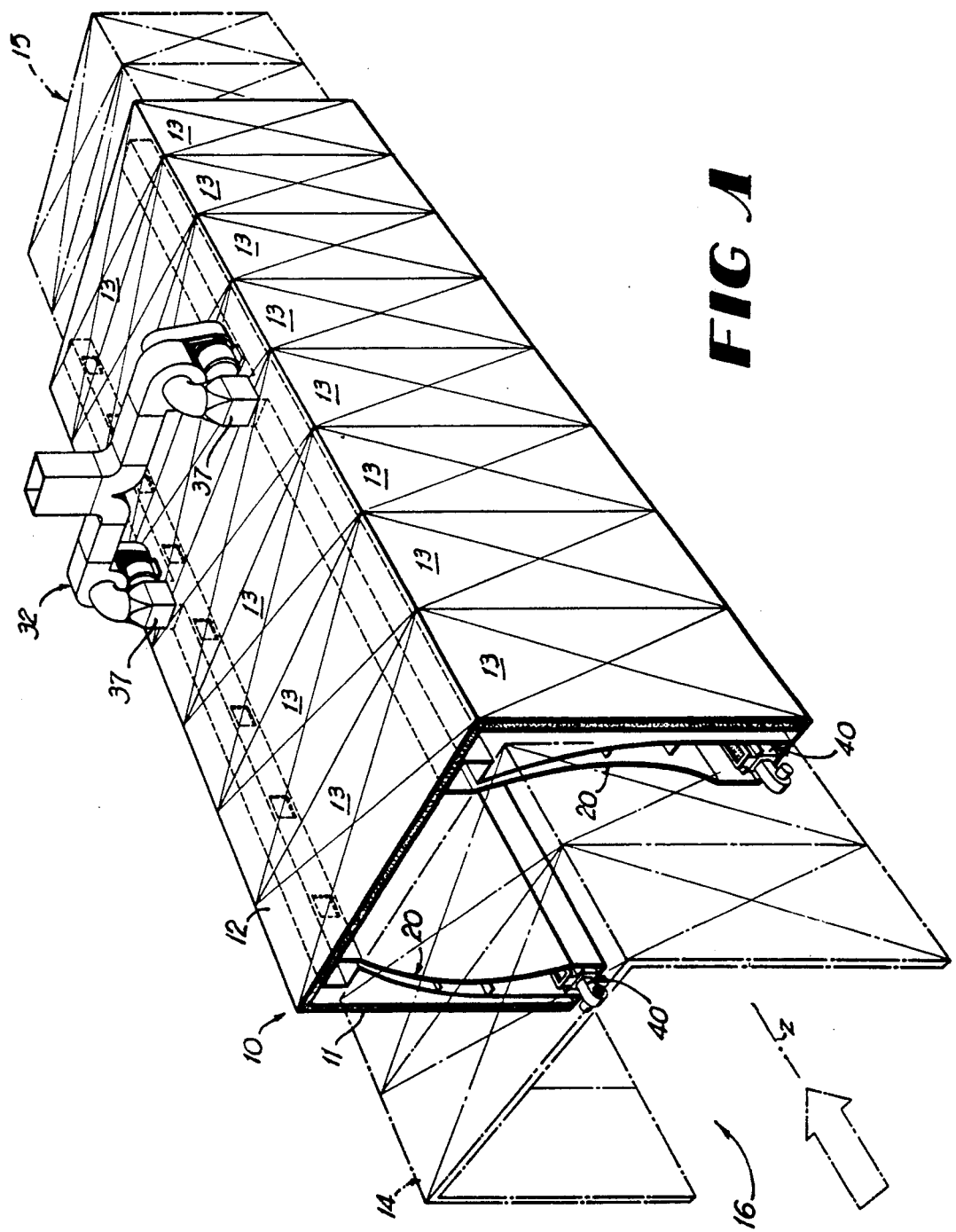
FIG. 1 is a perspective view of an industrial oven incorporating opposed radiant wall structure of the present invention.

Referring now in detail to the embodiments chosen for illustrating the present invention, FIG. 1 depicts an inverted, U-shaped oven housing 10 having opposed, spaced upstanding oven side walls 11, which support a horizontal oven top wall 12. Oven side walls 11 and top wall 12 are preferably constructed of abutting panels 13 of sheet metal and are joined along their appropriate edges to form oven side walls 11 and oven top wall 12. Oven housing 10 also preferably includes entrance vestibule 14 and exit vestibule 15 which are also inverted, U-shaped or channel-shaped members, but each of a smaller dimension than housing 10. The structure of housing 10 and vestibules 14 and 15 are known in the art, and disclosed in my previous patents listed above, as well as my U.S. Pat. No. 4,235,023 and my U.S. Pat. No. 4,426,792. The particular shape of housing 10 is not critical, and shapes other than the rectangular housing 10, as shown in FIG. 1, may be employed.

Invented housing 10 and vestibules 14 and 15 define an unobstructed passageway 16 therethrough. The oven housing 10 may include an oven bottom wall 17 which joins the bottom edges of respective side walls 11. Otherwise, oven bottom wall 17 can be eliminated, and the lower edges of side walls 11 can rest on the floor. A conveyor (not shown) can be provided through oven housing 10 to pass objects through passageway 16 to be processed, as is taught in my U.S. Pat. No. 4,426,792.

Mounted within passageway 16 of oven housing 10 along each side wall 11 are a pair of spaced, upstanding, opposed radiant wall assemblies 20. As shown in FIG. 1, radiant wall assemblies 20 are mounted along side walls 11 so as to define an unobstructed drying chamber 21 therebetween.

Figure 2:
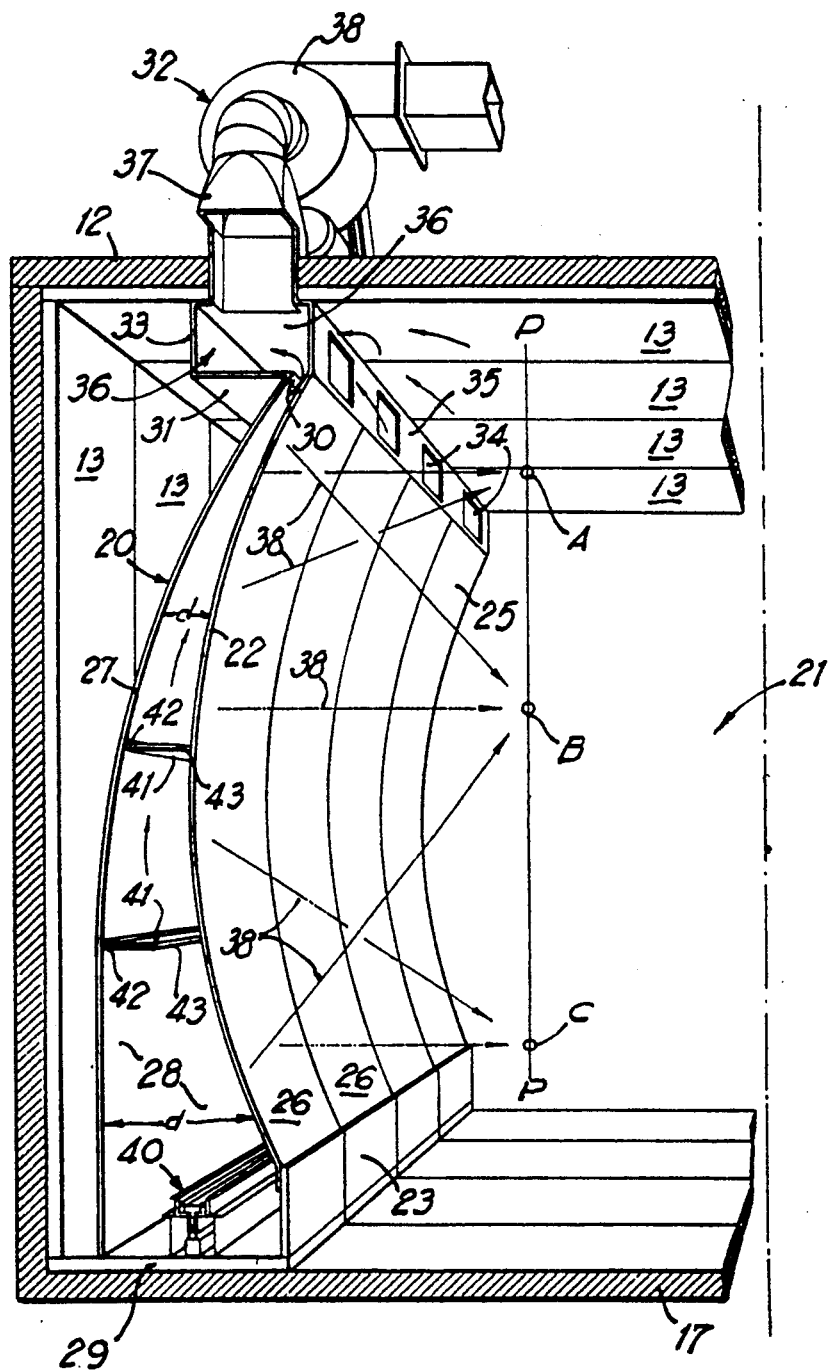
FIG. 2 is a cross-sectional view of the radiant wall structure illustrated in FIG. 1.

FIG. 2 shows one radiant wall assembly 20 in partial cross-section. Each assembly 20 extends vertically from bottom wall 17 to top wall 12, and horizontally the entire length of housing 10 along respective side wall 11. Radiant wall assembly 20 includes a radiant emitting first wall or radiant wall 22. Radiant wall 22 has a vertical, flat, lower portion 23 and an upstanding curvilinear portion 24 which curves about horizontal axis Z. Radiant wall 22 is substantially concave along its outer side 25 and is constructed of individual panels 26, assembled along their respective edges by any commonly known means, such as that taught in my prior U.S. Pat. No. 4,546,553 and U.S. Pat. No. 4,785,552, taking into account considerations such as thermal expansion and contraction, as is well known in the art.

Assembly 20 also includes a second, upstanding exterior wall 27 spaced outwardly from radiant wall 22 and curving about axis Z at a different curvature from that of wall 22, as shown in FIG. 2, so that a tubular combustion chamber 28 is created therebetween. In the embodiment shown in FIG. 2, walls 22 and 27 are spaced outwardly from one another a greater distance 'd' along their lower end portions, and curve about axis Z so that they are spaced at a lesser distance 'd' at their upper end portions. The cross-sectional area of combustion chamber 28 therefore decreases in the upward vertical direction from wall 17. Assembly 20 includes bottom wall 29 and upstanding side walls (not shown) at each end which close the ends of combustion chamber 28.

The respective upper ends of walls 22 and 27 terminate in spaced relationship, defining longitudinal exhaust port 30. Exhaust port 30 communicates along its entire length with the bottom wall 31 of exhaust assembly 32. Exhaust assembly 32 is of a conventional type, well known in the art, and includes elongate exhaust duct 33 which extends the entire length of walls 22 and 27. Exhaust duct 33 defines ambient exhaust apertures 34 along side wall 35 in spaced relationship allowing communication of drying chamber 21 with exhaust chamber 36, defined by exhaust duct 33. Apertures 34 can be covered with a mechanism such as slidable door or louvre (not shown), to selectively regulate the air drawn through each aperture 34 from the drying chamber 21 into exhaust duct 33, as discussed herein.

Vertical exhaust duct 37 joins exhaust duct 33, passing through top wall 12 and communicating with the low pressure intake side of centrifugal exhaust fan 38. It is readily understood, therefore, that the operation of exhaust fan 38 will pull air from both drying chamber 21 through apertures 34, as well as from combustion chamber 28 through exhaust port 30.

Disposed along bottom wall 29 of assembly 20 is line burner assembly or burner 40. Burner 40 can be of any known, conventional line burners, provided that proper input controls and air/gas manifolds are incorporated, as is well known in the art. For the most efficient operation, however, the present invention performs optimumly when the burner assembly of my pending U.S. patent application Ser. No. 295,264 is utilized. When this burner assembly is employed, many advantages are realized over using a conventional line burner, as is hereinafter discussed. The present invention, however, is operable when other gas line burners are used.

In operation, burner assembly 40 is ignited to burn an air/fuel mixture which delivers heated gases along a path of travel upwardly through combustion chamber 28. As the heated gases contact radiant wall 22, energy in the form of heat is transferred to wall 22 along the entire surface of wall 22. Radiant energy, as is indicated by arrows 38, is then directed outwardly from radiant wall 22 toward vertical plane P in drying chamber 21.

The gases from the burner 40 are at their highest temperature as they exit the burner surface. The energy that is transferred to the wall 22, at any point or increment of wall 22, is dependent upon the velocity and the temperature of the gases along the surface at that increment. Therefore, when the gas is at its maximum temperature, which is at the bottom increment of wall 22, the flow area in combustion chamber 28 is more open because of the increased distance 'd' between walls 22 and 27. As the heated gas rises within chamber 28, the temperature of the gas contained between walls 22 and 27 decreases. The flow area of chamber 28 controlled by dimension 'd' is also decreased, which increases the gas velocity to maintain the desired surface temperature on the corresponding increment of wall 22. Therefore, the temperature of increments of radiant wall 22 can be varied in its vertical dimension by varying the dimension d between walls 22 and 27. This feature is extremely beneficial in that it provides a method to improve the uniform distribution of the radiant flux density in the vertical dimension of the drying chamber 21, and also provides a method to concentrate more energy at a desired position in chamber 21, when required.

Referring to FIG. 2, if plane P represents the surface at which the radiant energy emitted by wall 22 is absorbed, for the same radiation emission level for all surfaces of wall 22, point 'B' will absorb more energy than either points 'A' or 'C'. As indicated by arrows 38, point 'B' would receive the normal radiation in addition to angular radiation from the top and bottom increments of wall 22. Points 'A' and 'C' will receive the normal radiation from the wall, but will received the angular radiation from only one direction. The development of a radiant wall structure 20 of the present invention provides a means to improve the distribution of the radiant energy at the absorbing plane 'P', by increasing the emission temperature in the lower increments of wall 22 and decreasing the emission temperature in the center increments of wall 22, then increasing the temperature at the top increments of wall 22. Therefore, by selectively varying the distance 'd' between walls 22 and 27, thereby varying the cross-sectional area of combustion chamber 28, the velocity of the heated gases impacting wall 22 is also selectively varied. By this method of varying dimension 'd', the amount of energy transferred to wall 22, and the amount of radiant energy emitted from wall 22 towards plane 'P' can be selectively controlled along any increment of wall 22.

As an additional control of the energy transferred to wall 22, baffles 41 are mounted to the inner side of wall 27 within combustion chamber 28. Baffles 41 are flat, planar, elongate members of sheet metal which are hingedly connected along one edge 42 to wall 27, with the opposite edge 43 extending toward radiant wall 22, but spaced therefrom. These baffles 41 have the effect of forcing the hot gases onto wall 22 at the desired increment, for temperature variation. When the baffle 41 is nearly horizontal, or when edge 43 is at its closest distance to wall 22, radiant wall 22 is heated to a higher level at the position of baffle 41. When the baffle 41 is angled upwardly from wall 27, the temperature on wall 22 at that position is decreased. The baffles 41 can be arranged to be mechanically actuated for selective biasing to a desired position. Such actuation means (not shown), such as a rod linkage, are well known in the art and, as is further well known in the art, could be electronically controlled by means which responds to a signal from either an electronic controller or from a temperature sensor along wall 22. This would cause baffles 41 to change their orientation automatically, depending upon process requirements.

Figure 3:
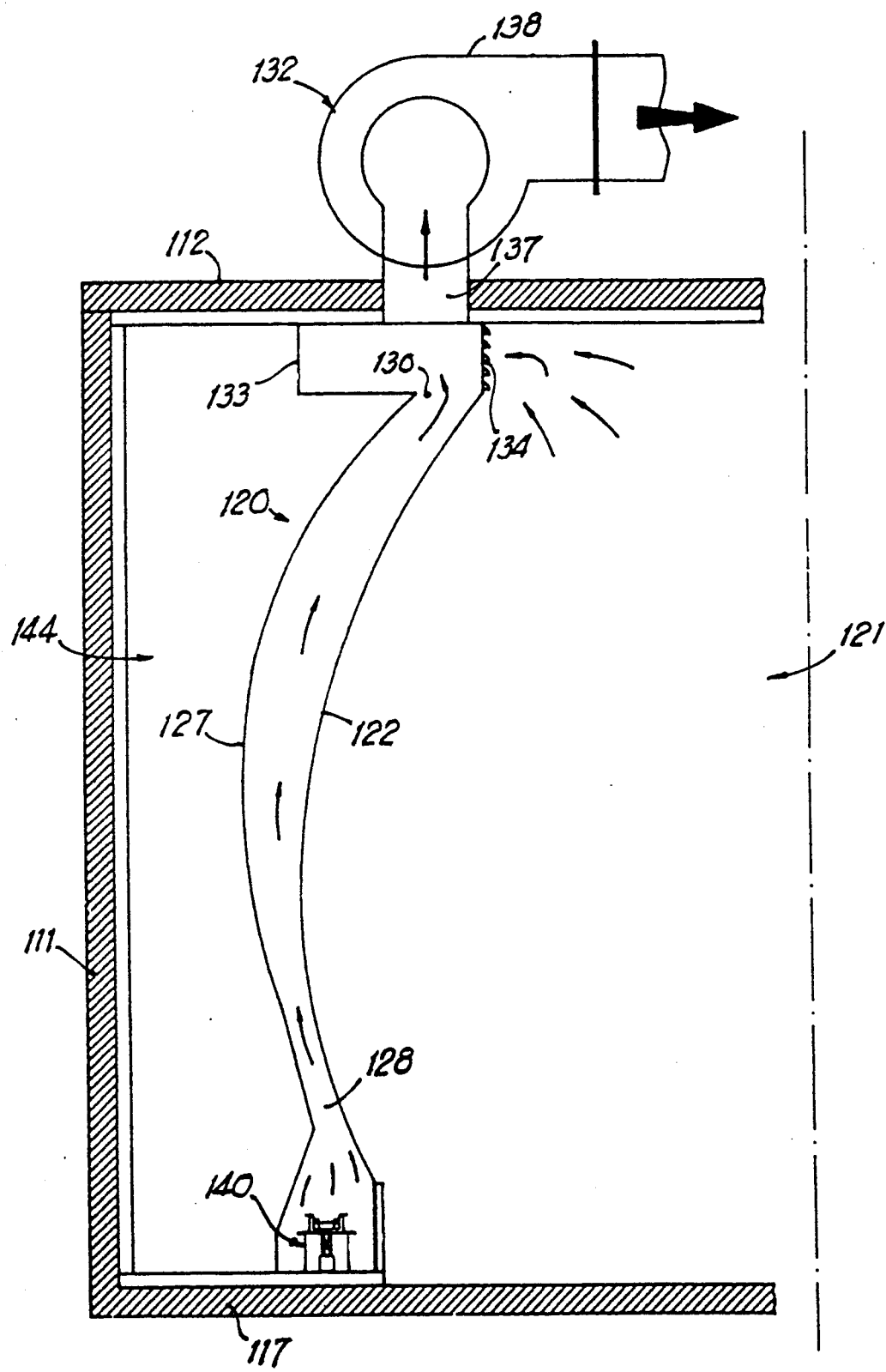
FIG. 3 is a cross-sectional, schematized view of another embodiment of the radiant wall structure.

FIG. 3 illustrates in schematized form a second embodiment of a radiant wall assembly 120. In this embodiment, heat is concentrated on the lower increments of radiant wall 122, and is decreased in the middle increments of wall 122. This is accomplished by selectively converging walls 122 and 127 where it is required to concentrate the heat, and then diverging the walls 122 and 127 at their upper increments. The velocity of the heated gases from burner 140 is increased at the lower, converging ingredients of walls 122 and 127, and is decreased as the walls 122 and 127 diverge, thus increasing then decreasing the heat transferred to wall 122. Walls 122 and 127 terminate in spaced relationship at their uppermost ends and connect to duct 133 to define exhaust port 130. Duct 133 in turn interconnects, via duct 137, to exhaust fan 138. In this embodiment, no preheating of any make-up air is required, nor is there any requirement to incinerate the exhaust gases from drying chamber 121. Therefore, the exhaust gases from drying chamber 121 enter directly into duct 133 through spaced, ambient exhaust apertures 134, and are thereafter exhausted by fan 138. To further confine the heat of combustion in chamber 128 to radiant wall 122, the space 144 created between the second wall 127 and the oven side wall 111 can be insulated. This embodiment of the invention ideally would be used where it would be required to concentrate higher levels of radiant flux density at the lower elevation of the drying chamber 121. This is desirable in an application, for example, of drying coatings on the frame of a truck body, in which heavy members are located near the floor of the oven.

Figure 4:
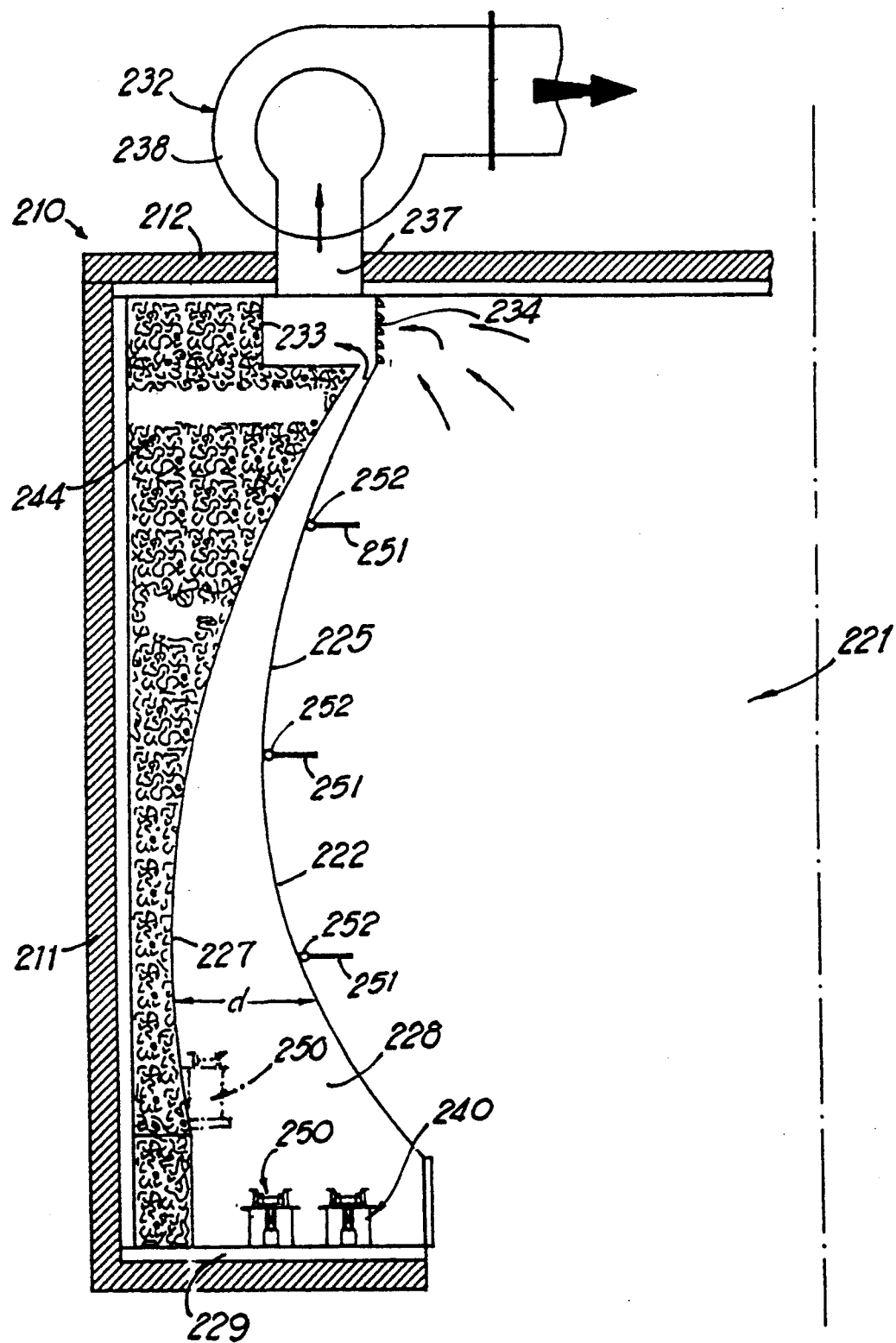
FIG. 4 is a cross-sectional, schematized view of another embodiment of the radiant wall structure.

A third embodiment is shown in FIG. 4, and utilizes two separate burner assemblies 240 and 250, adjacent to one another. Burner assembly 240, by the natural flow of the gases, provides more heat toward the bottom increments of wall 222. Burner assembly 250, by natural convection, provides most of the energy from its products of combustion from the bottom third of wall 222, upwardly. A partition (not shown), can be incorporated between the burners 240 and 250 to further segregate the hot gases.

Burner assembly 250 could also be elevated above bottom wall 229 and burner assembly 240, as shown in phantom lines. In this situation, an elevated burner assembly 250 would direct its hot gases of combustion toward the upper increments of wall 222, above assembly 240. Since the BTU/hr. input to burners 240 and 250 can be controlled independently, it is possible to actually control both the vertical incremental temperature of the emitter wall 222 as well as the temperature along the horizontal dimension of wall 222 from two different positions. Controlling the temperature of the radiant wall along either the vertical or the horizontal dimension of the radiant wall by selectively varying the input to the respective sections of the line burner, can be accomplished in all embodiments of the present invention disclosed herein. Although it is commonly known that separate burner input can be accomplished when using conventional line burners, this requires much redundant burner structure. The burner assembly of my pending application Ser. No. 295,264, much more efficiently controls burner input. However, in most applications, it will not be necessary to actually control the vertical incremental temperature of wall 222 from two different positions, but to simply rely upon the fact that a greater proportion of the energy released by the burner 240 nearest to the wall 222, will affect the radiant wall 222 surface temperature more on the lower increments of the wall 222. An embodiment incorporating two or more burners would be used in situations where the requirements of an industrial oven would be such that the vertical height would be greater than ordinary. Such would be the case in providing an industrial oven to process large objects such as off-road machinery. In this embodiment, it would be highly desirable to insulate the space 244 created between wall 227 and oven wall 211. The obvious reason being that in this embodiment as much energy should be converted to infra-red radiation from wall 222 as possible. Because of outside dilution air entering such a large oven through its entrance and exit vestibules, it is difficult to raise the ambient temperature in the oven drying chamber 221 very much, because of the large open ends that are required to accommodate large objects.

This embodiment also incorporates cascade plates 251 hingedly connected along one edge 252 to the concave surface 225 of radiant wall 222, and extending outwardly into drying chamber 221. For a fixed horizontal and vertical position of either or both of burners 240 or 250 between walls 222 and 227, and at fixed dimension 'd' at any point between walls 222 and 226, the emission temperature of the wall 222 can be varied on its surface by the installation of cascade plates 251. These plates decrease the convective energy that is absorbed from wall 222. Any number of plates 251 can be used to control the convective energy that is absorbed from wall 222. Also, the width of the plates 251 has an affect on the convective heat transfer (forced or free). The cascade plate 251 is preferably made from a material with a reflective surface, such as stainless steel.

Figure 5:
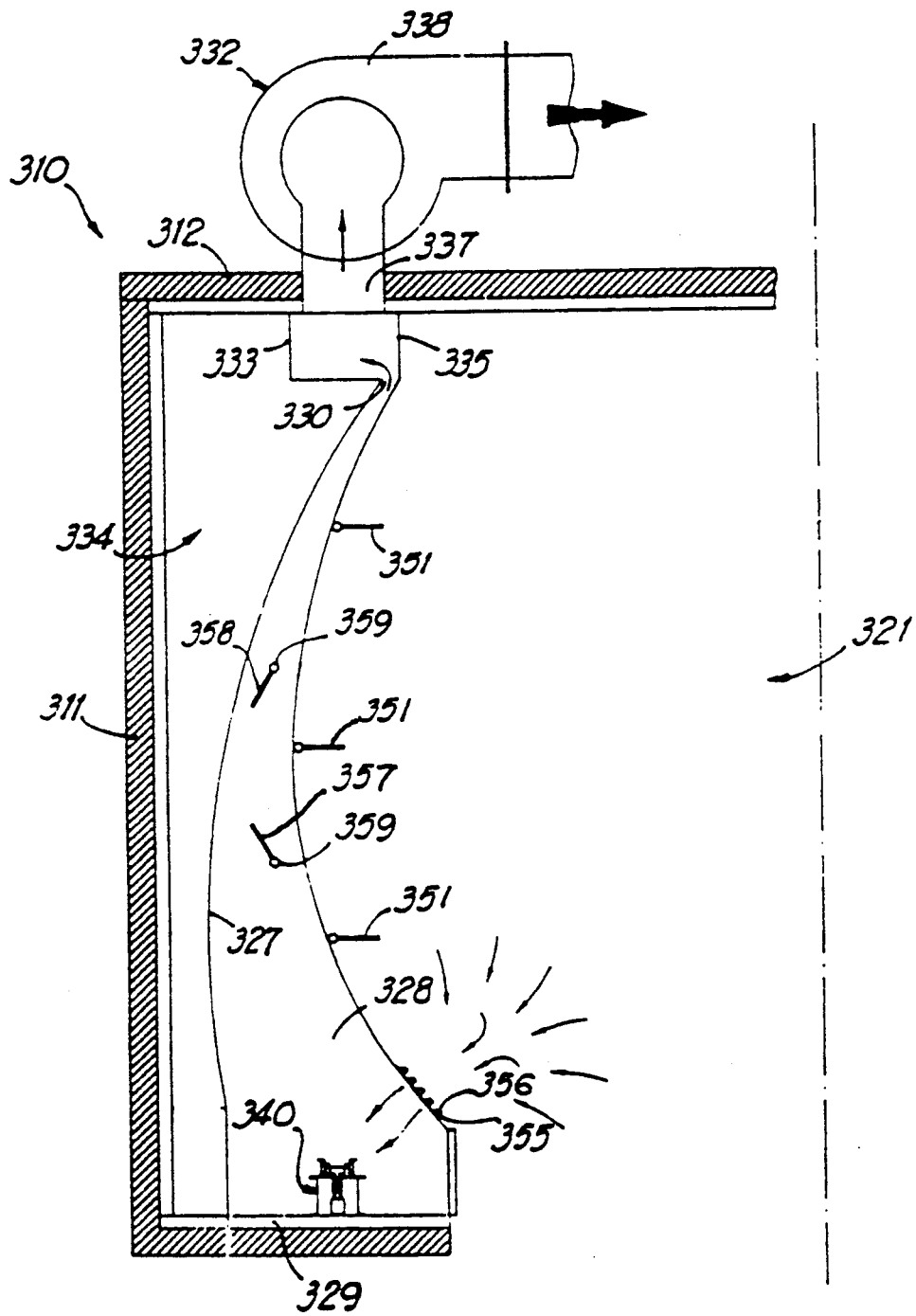
FIG. 5 is a cross-sectional, schematized view of another embodiment of the radiant wall structure.

FIG. 5 illustrates a fourth embodiment utilized when the requirements of the curing process do not require preheating of the oven's make-up air, and the VOC's in the exhaust gases in drying chamber 321 are to be directly incinerated by the heat of combustion from burner 340. The drying chamber's 321 exhaust gases are introduced directly into the combustion chamber 328 above the burner assembly 340. The negative pressure created within the chamber 328 by the fan 338 causes a controlled amount of the exhaust gases to be brought into chamber 328 through spaced, exhaust gas inlet ports 355, having louvres 356, to be incinerated. The incinerated exhaust gases and VOC's, along with the products of combustion from burner 340, enter duct 333 which ultimately interconnects to exhaust fan 338. Tests have shown that complete oxidation of the VOC's can be accomplished within 10" to 14" from the surface of the burner 340, depending on the distance 'd' between walls 322 and 327. A separate exhaust duct is eliminated by this method of incineration.

In this embodiment, the cascade plates 351 can be selectively used, depending upon the emitter temperature requirements. Also, directional vanes, such as vanes 357 and 358, may be selectively used. The directional vanes 357 and 358 are identical elongate, flat plates, hingedly connected at one edge 359 to a support linkage (not shown) and supported within combustion chamber 328. The vanes 357 and 358 can be selectively biased in the same manner as baffles 43, previously discussed. The temperature of the surfaces of wall 322 can be varied by the directional vanes 357 and 358. As vane 357 is shown positioned in the direction of the gas flow, the temperature on the surface of the wall 322 immediately above the vane 357 is lowered. When a vane is positioned in the direction opposite to the gas flow, such as vane 358, the temperature of the wall 322 is increased immediately below and at the elevation of the vane 358. Vanes 357 and 358 can be fixed or can be variable by a turning mechanism, also as discussed above with reference to baffles 43. In this embodiment of the invention, the cavity 344 formed by the wall 327 and the oven exterior wall 311 could be packed with insulation. However, the oven wall 311 itself usually contains 4" to 8" of insulation, and in some applications additional insulation would not be required.

In a fifth embodiment, provision is made to preheat the exhaust gases from drying chamber 421 prior to introduction of gases into combustion chamber 428 for incineration of the VOC's. A series of spaced, transversely extending ducts 434 defined above longitudinal exhaust duct 433 permit communication of drying chamber 421 with heating chamber 444. Heating chamber 444 is defined by second wall 427, oven side wall 411, and bottom wall 429, and is closed at each end by upstanding end walls (not shown). Transverse ducts 434 are spaced above the length of radiant wall assembly 420 to allow a free flow of exhaust gases along the drying chamber 421 to enter heating chamber 444.

Figure 6:
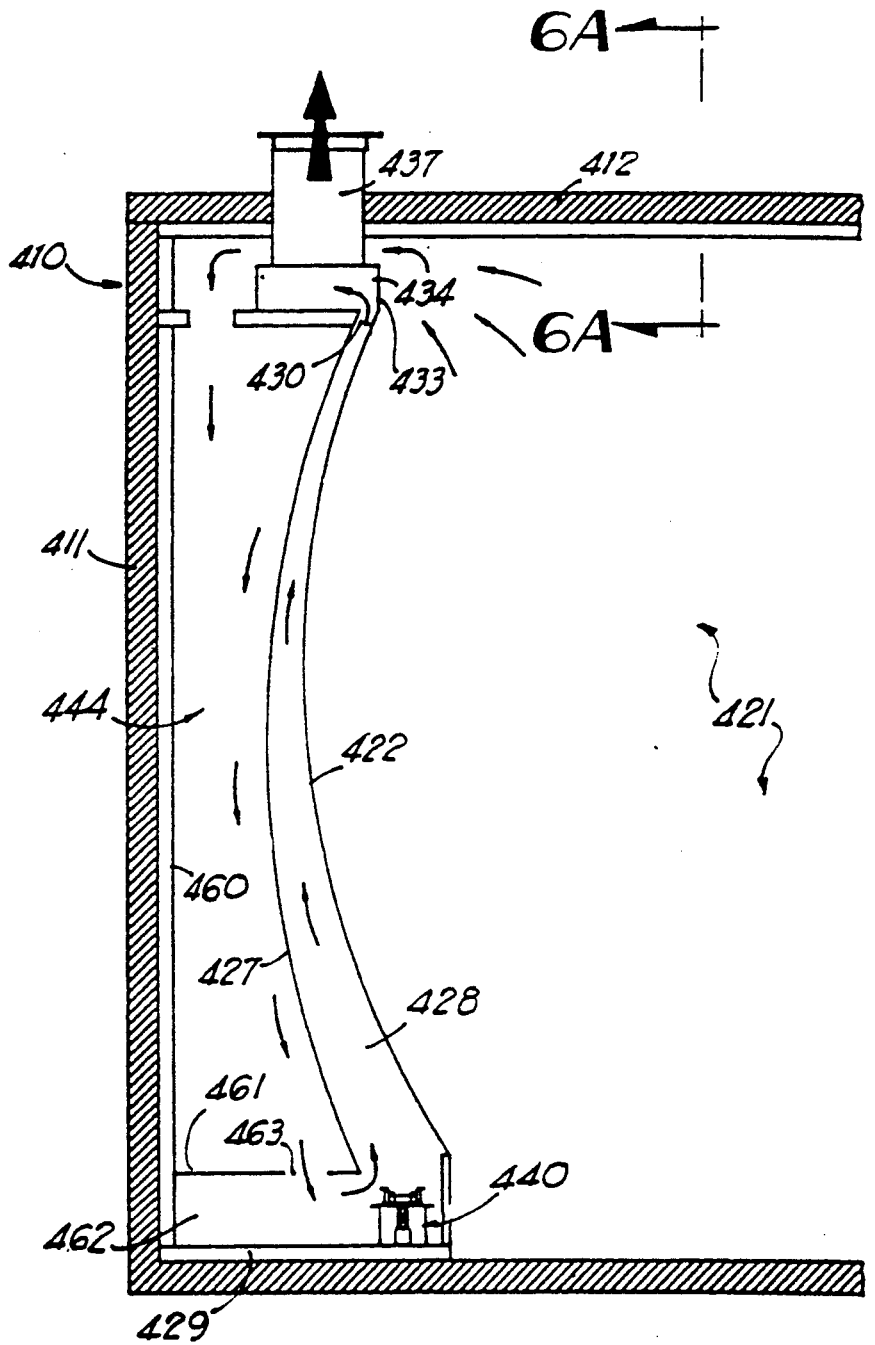
FIG. 6 is a cross-sectional, schematized view of another embodiment of the radiant wall structure.
Figure 6A:
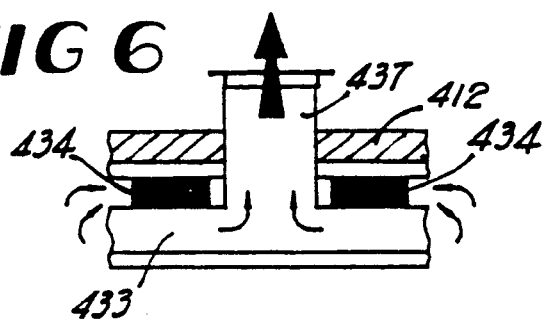
FIG. 6A is a vertical sectional view taken substantially along line 6A—6A in FIG. 6.
Figure 7:
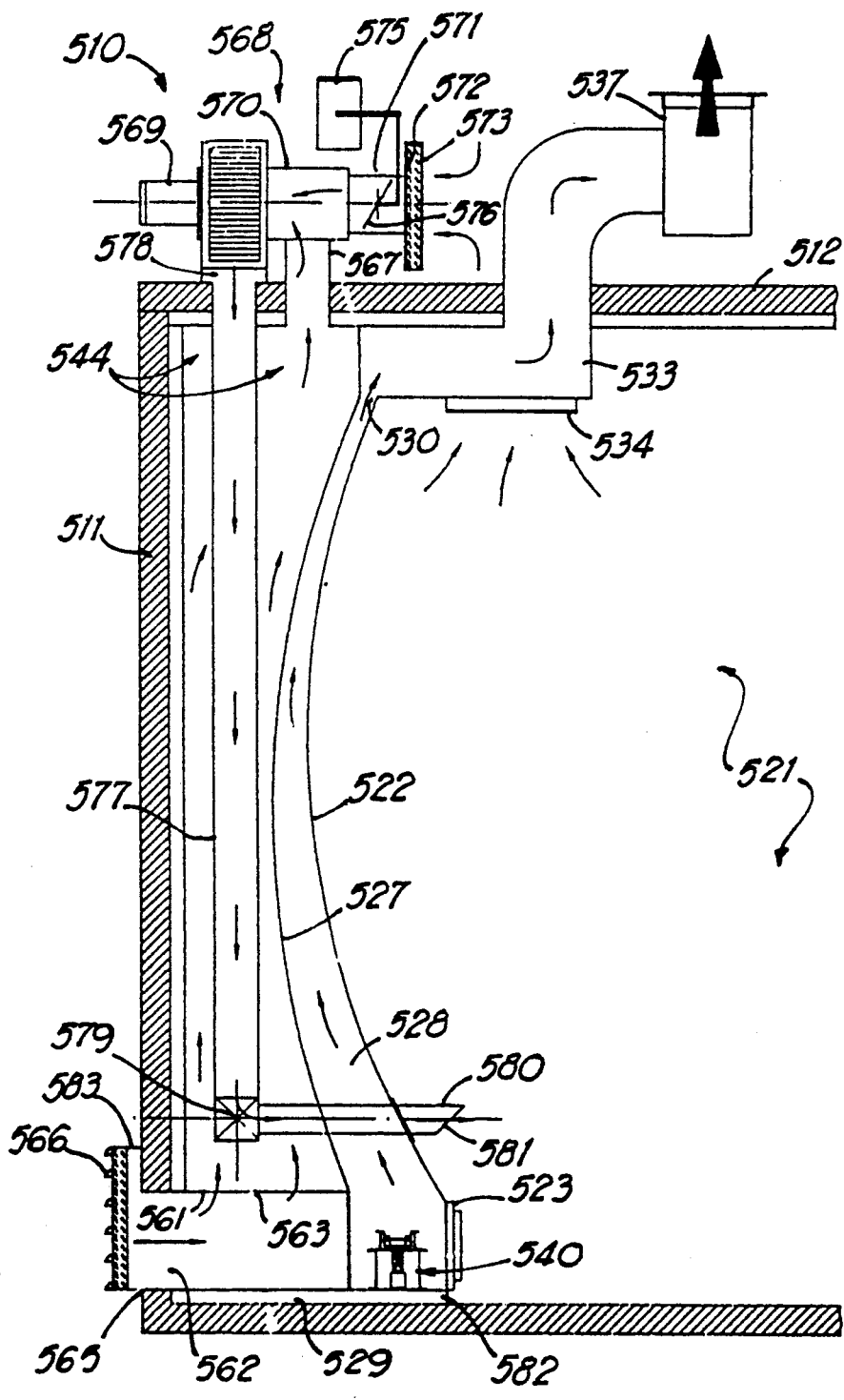
FIG. 7 is a cross-sectional, schematized view of another embodiment of the radiant wall structure.

In this embodiment, the heated gases from burner assembly 440 impinge on wall 422 as in the previous embodiments. Heating chamber 444, however, cannot be filled with insulation, which is an option in the previous embodiments. The heated gases from burner 440 also impinge on exterior wall 427 which becomes thereby heated, and which also emits radiant energy into chamber 444 to heat the inner side 460 of oven side wall 411. The products of combustion from assembly 440 are exhausted through duct 437, as in prior embodiments. Heating chamber 444 includes bottom wall 461 which is spaced above wall 429 to create a chamber 462 therebetween, which communicates directly with the lower portion of combustion chamber 428, as shown in FIG. 6. Wall 461 further defines a series of spaced ports or orifices 463 therein, to allow communication of heating chamber 444 with chamber 462. Orifices 463 provide a pressure drop to ensure uniform introduction of the exhaust gases to chamber 462, then into combustion chamber 428. Alternatively, ports 463 can instead be defined by wall 427 just above the height of burner assembly 440, to introduce the heated gases directly into combustion chamber 428.

The negative pressure imparted by the exhaust assembly (not shown) connected to exhaust duct 437 as in the prior embodiments, additionally pulls exhaust gas from drying chamber 421, through transverse ducts 434 and into heating chamber 444. The exhaust gases are preheated in chamber 444 by convection from walls 427 and 460 before they are drawn through orifices 463, into chamber 462 and then into combustion chamber 428 at or just above burner assembly 440. The VOC's in the exhaust gases are then incinerated by burner assembly 440, and the products of combustion are exhausted. By preheating the exhaust gases prior to incineration, a greater volume of VOC's can be incinerated than would be achieved when the exhaust gases are not preheated.

A sixth embodiment is employed in situations where it is desirable to provide controlled, preheated make-up air to the drying chamber 521. Combustion chamber 528 is formed between radiant wall 522 and second wall 527, and as in the first embodiment, the products of combustion from burner assembly 540 are exhausted through elongate port 530 by an exhaust assembly (not shown). Ports 534 are spaced along longitudinally extending exhaust duct 533 to permit the VOC's contained in the exhaust gases of drying chamber 521 to be directly exhausted, also through ducts 533 and 537.

Fresh air inlet ports 565 are defined by the lower portion of oven side wall 511 and spaced along wall 511. An adjustable, louvre 566, and filter 583 cover ports 565 to selectively control the fresh air flowing through ports 565. Wall 561 extends from wall 511 horizontally above bottom wall 529 to second wall 527, so as to define air chamber 562. Spaced orifices 563 in wall 561 permit the communication between air chamber 562 and heating chamber 544, defined between oven side wall 511 and exterior wall 527.

Extending upwardly from heating chamber 544 through oven top wall 512 is duct 567. Mounted on top wall 512 above and communicating with duct 567 is blower assembly 568. Blower assembly 568 includes centrifugal blower 569 having inlet duct 570 at its low pressure side. Inlet duct 570 is connected to and communicates with the upper end of duct 567, and also to fresh air inlet 571. Air inlet 571 communicates at one end with duct 570 and is open at its other end 572 to the atmosphere outside oven housing 510. Filter 573 covers the open end 572 so that any air entering blower assembly 568 therefrom is properly filtered to remove suspended foreign matter such as dust.

An electronically operated controller 575 controls the position of damper 576, which is contained in fresh air inlet 571. Thus, an electronic signal from controller 575 causes damper 576 to bias to an opened or closed position in inlet 571, controlling the amount of fresh air entering blower assembly 568 through inlet 571. The controller can receive a signal from a sensor (not shown) in the drying chamber to initiate its actuation, or can be actuated by a manual control means. These elements for automatically controlling damper 576 are well known and understood by those in the art. Extending downwardly through top wall 512 from the high pressure side of centrifugal blower 569 is make-up air heating duct 577. Duct 577 communicates at its upper end 578 with the high pressure side of centrifugal blower 569 and extends downwardly through heating chamber 544, and connects to horizontal make-up air supply duct 579. Duct 579 extends horizontally within heating chamber 544 along the length of radiant wall structure 20. Spaced along duct 579 and attached thereto and communicating with duct 579 are spaced outlets 580. Outlets 580 extend through walls 527 and 522 and terminate along the lower portion of wall 522 in drying chamber 521 to define outlet ports 581. Spaced access plates 582 in wall 523 are releasably secured to wall 523 to cover access ports (not shown) in wall 523. Burner assembly 540 can thus easily be accessed for maintenance. Access plates 582 can be incorporated into any of the embodiments of the present invention.

This sixth embodiment operates in a similar fashion to the assembly 20 of the first embodiment, except for the preheating and delivery of make-up air to drying chamber 521. The operation of blower 569 causes a negative pressure in heating chamber 544, which draws fresh air through louvre 566 and filter 583, and into chamber 562, then through spaced orifices 563 and upwardly into heating chamber 544. In heating chamber 544 this fresh air is heated by convection from wall 527. The heated fresh air is drawn upwardly through duct 567 and into inlet duct 570, where it is mixed with outside fresh air which is drawn by blower 569 though filter 573 and fresh air inlet 571. The controller 575 operates damper 576 to selectively control the amount of unheated fresh air that mixes with the heated fresh air in duct 570, so that the temperature of the mixed air is equal to the ambient temperature of the oven. This mixed air is forced by blower 569 downwardly through make-up air heating duct 577, into make-up air supply duct 579 and then into respective spaced outlets 580. This filtered, heated make-up air is then delivered through ports 581 into drying chamber 521 along the length of radiant wall 522.

In this embodiment the input to the burner 540 is preferably controlled by a proportioning temperature controller (not shown) which receives its signal directly from a sensor (not shown) which measure the radiant wall's 522 temperature. The amount of heat transferred to the make-up air through wall 527, with few exceptions, should always be greater than the amount of energy required, and therefore the final temperature of the air entering the drying chamber 521 is controlled by diluting the heated air with a proportional amount of filtered room air.

Figure 8:
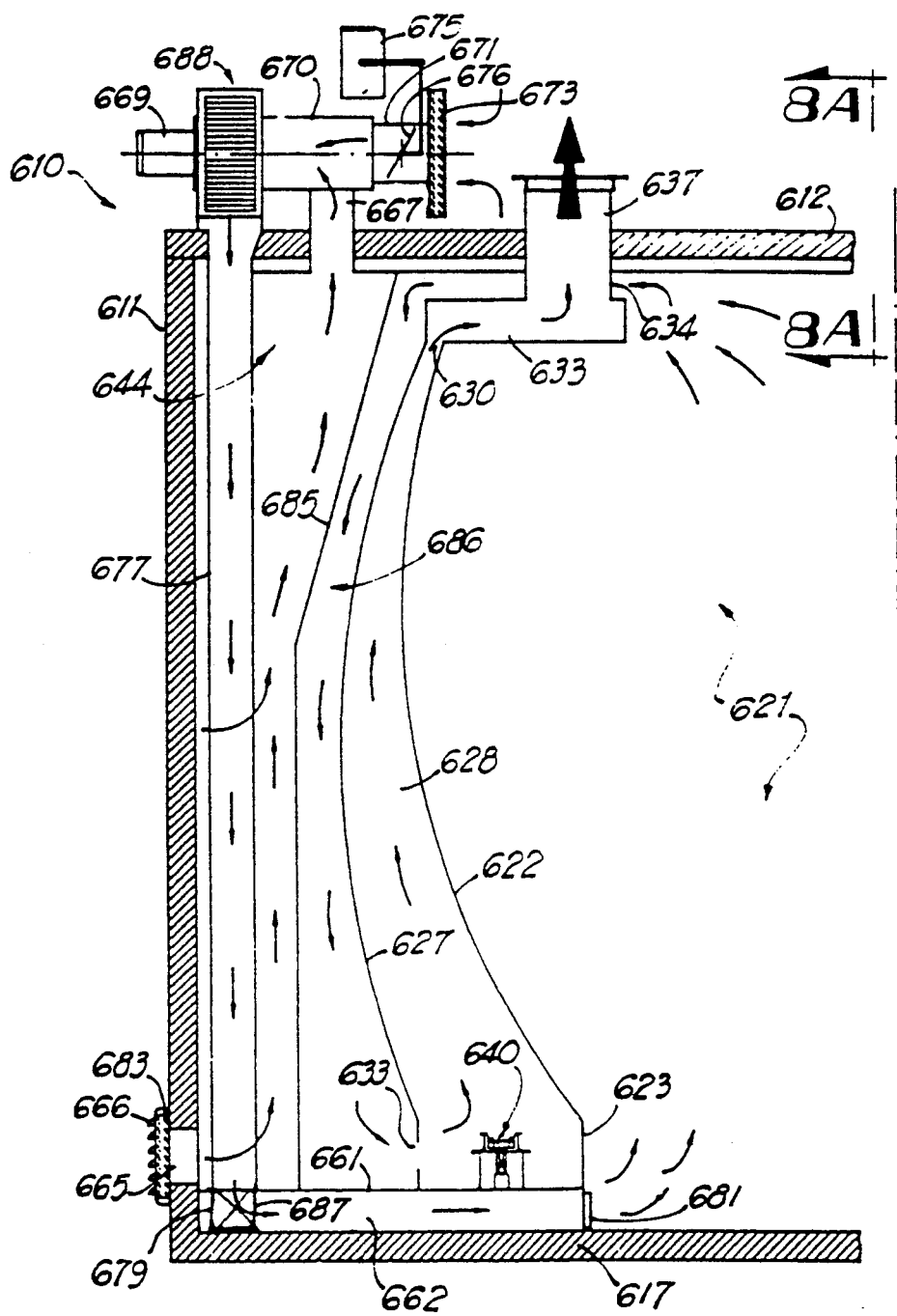
FIG. 8 is a cross-sectional, schematized view of another embodiment of the radiant wall structure.
Figure 8A:
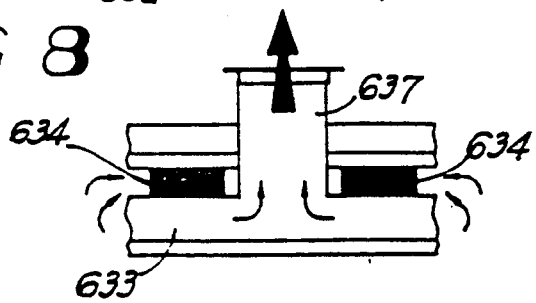
FIG. 8A is a vertical, sectional view taken substantially along line 8A—8A in FIG. 8.

The seventh embodiment, illustrated in FIG. 8 is similar to that of the sixth embodiment, except that means is included to preheat the exhaust air exhausted from drying chamber 621, and simultaneously heat filtered, fresh, make-up air for delivery back into drying chamber 621.

This embodiment includes an upstanding third wall 685 spaced outwardly from second wall 627 and inwardly from oven side wall 611 to divide heating chamber 644 into two chambers, fresh air heating chamber 644 and exhaust air heating chamber 686. Third wall 685 extends upwardly from bottom wall 661 to oven top wall 612 so that no communication is permitted between fresh air heating chamber 644 and exhaust air heating chamber 686. In this embodiment, port 665 is defined in the lower portion of oven side wall 611 above transversely extending bottom wall 661. Bottom wall 661 is, as in the previous embodiment, spaced upwardly from bottom oven wall 617 to define a chamber 662 therein. However, bottom wall 661 does not include any apertures positioned to allow communication between chamber 662 and either fresh air heating chamber 644 or exhaust air heating chamber 686. Further, in this embodiment, make-up air heating duct 677 extends downwardly from the high pressure side of centrifugal blower 669, through heating chamber 644, and through bottom wall 661, where heating duct 677 terminates at and communicates with longitudinally extending supply duct 679. Supply duct 679 empties through spaced ports 687 into chamber 662. Chamber 662 is further defined to extend below burner assembly 640 and terminating at bottom portion 623 of radiant wall 622 at spaced ports 681, which open into drying chamber 621. Additionally, second wall 627 defines elongate, longitudinally extending, aperture 663 defined along its lower portion, at or slightly above the level of burner assembly 640, as shown in FIG. 8. Transverse air ducts 634 are disposed above longitudinally extending exhaust ducts 633 at spaced locations along the upper edges of walls 622 and 627, to permit communication of the drying chamber 621 to the exhaust gas heating chamber 686, without allowing communication of combustion chamber 628 with either drying chamber 621 or with exhaust heating chamber 686.

In operation of the seventh embodiment, heated exhaust gases are delivered upwardly from burner 640 through combustion chamber 628, being drawn upwardly by an exhaust assembly (not shown) out of combustion chamber 628. Simultaneously, the negative pressure created by the exhaust assembly (not shown) is communicated through elongate aperture 663 to exhaust gas heating chamber 686. Thus, exhaust gas, including the VOC's contained therein, is pulled from drying chamber 621, through transverse ducts 634 and downwardly into exhaust gas heating chamber 626. The exhaust gas is heated by convection from second wall 627 as it passes downwardly through chamber 626. Further, third wall 685 is also heated by the radiant energy emitted by wall 627 through chamber 686. The exhaust gases then pass through elongate aperture 663 and into combustion chamber 628. This preheated exhaust gas is then incinerated by burner 640 and drawn upwardly through chamber 628 and exhausted therefrom. Simultaneously, centrifugal blower assembly 668 pulls fresh make-up air through louvres 666 and filter 683 and into heating chamber 644. As the fresh make-up is drawn upwardly through heating chamber 644 it is heated by convection form third wall 685. The air is then drawn through duct 667 and into fresh air inlet duct 670, where it is mixed with fresh outside air drawn by blower assembly 668 through fresh air inlet 671. This mixed air is forced by blower assembly 668 downwardly through make-up air heating duct 677 and into longitudinally extending make-up air supply duct 679. The filtered, preheated air is then forced through chamber 662 and through spaced ports 681 and into drying chamber 621. Thus, in the present embodiment, exhaust gases are preheated and delivered to the combustion chamber for incineration of the VOC's therein, and also fresh air is preheated and delivered to the drying chamber for convective heat transfer in the drying chamber 621.

This embodiment of the present invention provides for all of the heat transfer modes within the confines of the oven exterior walls 611. Infrared radiation is generated from the radiant wall 622 and is directed into the drying chamber 621. Also, some convective energy is created by wall 622. The single source of energy from burner 640 is further used to provide the energy to preheat the exhaust products and to ultimately incinerate them.

Figure 9:
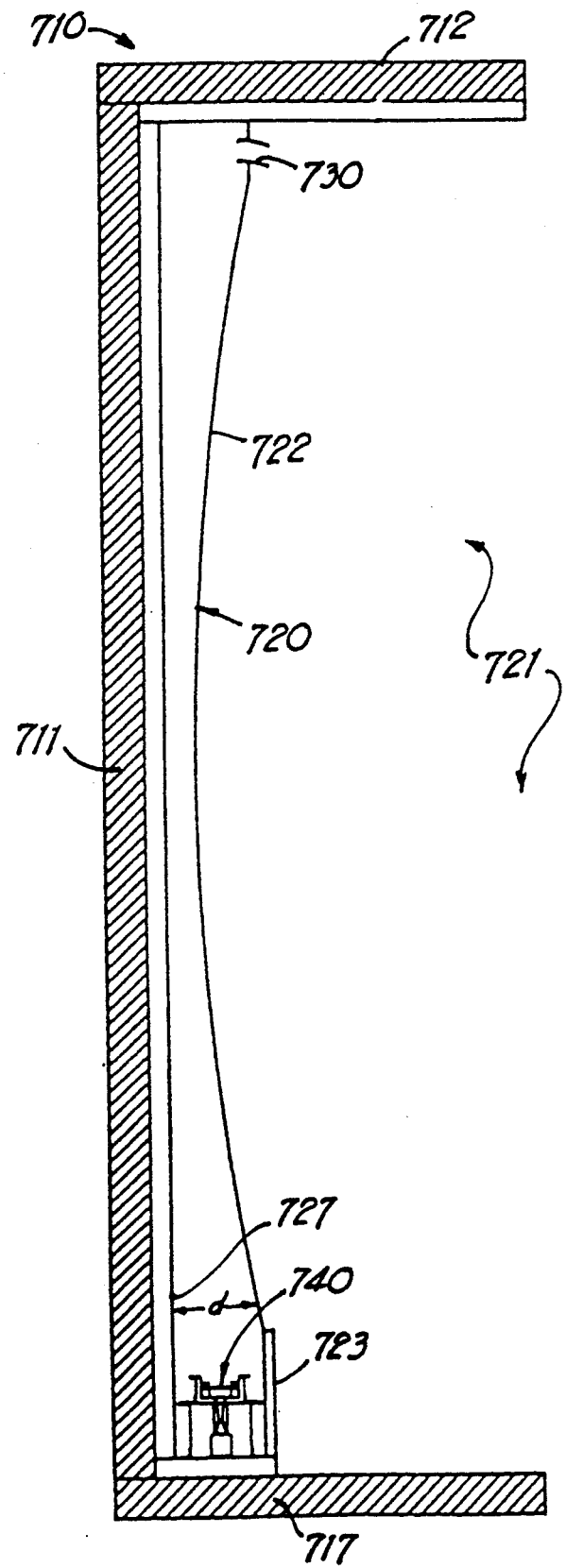
FIG. 9 is a cross-sectional, schematized view of another embodiment of a radiant wall structure.

A radiant wall structure of the present invention can be incorporated into an existing oven housing to convert all or a portion of the oven to a radiant energy emitting type of oven. FIG. 9 depicts a radiant wall insert 720 placed within an existing oven enclosure 710. An aperture 730 defined at the top of radiant wall 722 permits the hot products of combustion to be discharged directly into drying chamber 721. In such a conversion, propeller-type turbulator fans (not shown) could be used to circulate the gases within drying chamber 721, or the products of combustion could be expelled into a duct (not shown) for discharge. This embodiment of the present invention can be constructed very narrow in width (dimension d) of 9 inches or less, which allows relatively easy installation into most oven-type enclosures.

It should be understood that the baffles 43 cascade plates 251 or vanes 358 can be incorporated into any of the above-described embodiments to assist in controlling the heat transfer processes.

It will further be obvious to those skilled in the art that many variations may be made in the above embodiments here chosen for the purpose of illustrating the present invention, and full result may be had to the doctrine of equivalents without departing from the scope of the present invention, as defined by the appended claims.

What I claim is:

1. A radiant wall structure for a heat transfer oven for drying objects passed along a prescribed path therethrough, comprising:
   (a) a conveyor for transporting objects successively along said projected path;
   (b) a radiant emitting wall curving about a horizontal axis and defining a continuously concave, radiant energy emitting surface along the entire radiant emitting wall;
   (c) a second wall spaced from said radiant emitting wall for creating a chamber therebetween; and
   (d) heating means communicating with said chamber for directing heated gases through said chamber, wherein the cross-sectional area of said chamber progressively varies for varying the velocity of said gases directed through said chamber to thereby vary the amount of heat delivered to selected increments of said radiant emitting wall.

2. An apparatus for generating radiant energy, comprising:
   (a) a first wall uniformly curving about a first horizontal axis for emitting radiant heat;
   (b) a second wall uniformly curving about a second horizontal axis and said second wall adjacent to and spaced from said first wall;
   (c) means for closing the end portions of said first wall and said second wall, for defining, with said first wall and said second wall, an unobstructed chamber;
   (d) means for providing heated gases for movement along a path of travel from the bottom portion of said chamber up through said chamber for heating said first wall; and
   (e) means associated with said chamber for progressively varying the velocity of said gases moving in said chamber to thereby progressively vary the amount of heat delivered to successive increments of said first wall, said means associated with said chamber comprising a progressively varying cross-sectional area of said chamber.

3. The radiant wall structure of claim 1, wherein said heating means comprises a linear burner.

4. The radiant wall structure of claim 1, wherein said heating means is disposed between said radiant emitting wall and said second wall.

5. The radiant wall structure of claim 1, further comprising an exhaust means for withdrawing said gas from said chamber.

6. The radiant wall structure of claim 1, further comprising a baffle means mounted along said second wall within said chamber for forcing said gas against said radiant emitting wall.

7. The radiant wall structure of claim 1, further comprising access means disposed in said radiant emitting wall for providing access to said chamber.

8. The radiant wall structure of claim 1, further comprising duct means disposed along the upper portion of said radiant emitting wall for allowing air from said chamber and from an outer side of said radiant emitting wall to pass through said duct means and along the outer side of said second wall, and wherein said second wall defines an opening along its lower portion for allowing said air to enter said chamber.

9. The radiant wall structure of claim 1, further comprising fresh make-up means for delivering air outwardly away from said radiant emitting wall.

10. The radiant wall structure of claim 5, wherein said exhaust means further comprises a centrifugal blower.

11. The radiant wall structure of claim 9, further comprising means for preheating said air before passing it outwardly away from said outer surface of said radiant emitting wall.

12. A radiant wall structure, comprising:
   (a) a radiant emitting wall having an exterior radiant energy emitting surface and an interior surface, said exterior radiant energy emitting surface being entirely continuously concave;
   (b) a second wall spaced outwardly a distance from said radiant emitting wall for defining a combustion chamber therebetween; and
   (c) heating means disposed within said combustion chamber for delivering heated gas through said combustion chamber, and imparting heat to said radiant emitting wall whereby the distance between said radiant emitting wall and said second wall is selectively varied to vary the velocity of said heated gas to thereby vary temperature along said radiant emitting wall; and
   (d) directional vent means disposed between said radiant emitting wall and said second wall for directing said heated gas delivered through said combustion chamber.

13. The radiant wall structure of claim 12, further comprising a cascade plate means mounted along said radiant emitting wall for controlling the convective energy which is absorbed from said radiant emitting wall.

14. The radiant wall structure of claim 12, further comprising duct means disposed along the upper portion of said radiant emitting wall for allowing air from said combustion chamber and from an outer side of said radiant emitting wall to pass through said duct means and along the outer side of said second wall, and wherein said second wall defines an opening along its lower portion for allowing said air to enter said combustion chamber.

15. The radiant wall structure of claim 12, further comprising a fresh make-up air means for delivering air outwardly away from said exterior radiant energy emitting surface of said radiant emitting wall.

16. The radiant wall structure of claim 15, wherein said fresh make-up air means includes a duct spaced outwardly from said second wall and a portion of said duct passing through said second wall and said radiant emitter wall and defining a port spaced outwardly from said exterior radiant energy emitting surface of said radiant emitter wall.

17. The radiant wall structure of claim 16, wherein said fresh make-up air means includes blower means for delivering fresh air through said duct and said port and outwardly from said exterior radiant energy emitting surface of said radiant emitting wall.

18. The radiant wall structure of claim 17, wherein said blower means further comprises a centrifugal blower.

19. The radiant wall structure defined in claim 17, wherein said fresh make-up air means further comprises damper means to vary the quantity of air delivered by said fresh air duct means.

20. The radiant wall structure of claim 19, wherein said damper means further comprises a damper and a controller means connected to said damper to automatically control the actuation of said damper to vary the quantity of air delivered by said fresh air duct means.

21. The apparatus of claim 2, wherein said means for providing heated gases comprises a linear burner.

22. The apparatus of claim 2, wherein said means for providing heated gases is disposed between said first wall and said second wall.

23. The apparatus of claim 2, further comprising an exhaust means for withdrawing said gases from said chamber.

24. The apparatus of claim 2, further comprising a baffle means mounted along said second wall within said chamber for forcing said gases against said first wall.

25. The apparatus of claim 2, further comprising access means disposed in said first wall for providing access to said chamber.

26. The apparatus of claim 2, further comprising duct means disposed along the upper portion of said first wall for allowing air from said chamber and from the outer side of said first wall to pass through said duct means and along the outer side of said second wall, and wherein said second wall defines an opening along its lower portion for allowing said air to enter said chamber.

27. The apparatus of claim 2, further comprising fresh make-up air means for delivering air outwardly away from said first wall.

28. The apparatus of claim 2, wherein said chamber is progressively increased for varying the velocity of said gases directed through said chamber.

29. The apparatus of claim 2, wherein said chamber is progressively decreased for varying the velocity of said gases directed through said chamber.

30. The apparatus of claim 23, wherein said exhaust means comprises a centrifugal blower.

31. The apparatus of claim 30, further comprising means for preheating said air before passing said air outwardly away from said first wall.

32. A heater for a heat transfer oven for drying paint coatings, comprising:
   a first wall having a continuously concave, radiant energy emitting surface;
   a second wall spaced from said first wall for creating a chamber therebetween;
   heating means communicating with said chamber for directing heated gases through said chamber; and
   said chamber having a varying cross-sectional area for varying the velocity of said heated gases moving in said chamber to thereby vary the amount of heat delivered to successive increments of said first wall.

33. A radiant wall structure for a heat transfer oven for drying objects passed along a prescribed path therethrough, comprising:
   (a) a conveyor for transporting objects successively along said prescribed path;
   (b) a radiant emitting wall curving about a horizontal axis and defining a substantially continuously concave, radiant energy emitting surface;
   (c) a second wall spaced from said radiant emitting wall for creating a chamber therebetween;
   (d) heating means communicating with said chamber for directing heated gases through said chamber, wherein the cross-sectional area of said chamber progressively varies for varying the velocity of said gases directed through said chamber to thereby vary the amount of heat delivered to selected increments of said radiant emitting wall; and
   (e) duct means disposed along the upper portion of said radiant emitting wall for allowing air from said chamber and from an outer side of said radiant emitting wall to pass through said duct means and along the outer side of said second wall, and wherein said second wall defines an opening along its lower portion for allowing said air to enter said chamber.

34. A radiant wall structure for a heat transfer oven for drying objects passed along a prescribed path therethrough, comprising:
   (a) a conveyor for transporting objects successively along said projected path;
   (b) radiant emitting wall curving about a horizontal axis and defining a substantially continuously concave, radiant energy emitting surface;
   (c) a second wall spaced from said radiant emitting wall for creating a chamber therebetween;
   (d) heating means communicating with said chamber for directing heated gases through said chamber, wherein the cross-sectional area of said chamber progressively varies for varying the velocity of said gases directed through said chamber to thereby vary the amount of heat delivered to selected increments of said radiant emitting wall; and
   (e) fresh make-up air means for delivering air outwardly away from said radiant emitting wall.

35. The radiant wall structure of claim 34, further comprising means for preheating said air before passing it outwardly away from said outer surface of said radiant emitting wall.

36. A radiant wall structure, comprising:
   (a) a radiant emitting wall having an exterior radiant energy emitting surface and an interior surface;
   (b) a second wall spaced outwardly a distance from said radiant emitting wall for defining a combustion chamber therebetween;

(c) heating means disposed within said combustion chamber for delivering heated gas through said combustion chamber, and imparting heat to said radiant emitting wall whereby the distance between said radiant emitting wall and said second wall is selectively varied to vary the velocity of said heated gas to thereby vary temperature along said radiant emitting wall;

(d) directional vent means disposed between said radiant emitting wall and said second wall for directing said heated gas delivered through said combustion chamber; and (e) duct means disposed along the upper portion of said radiant emitting wall for allowing air from said combustion chamber and from an outer side of said radiant emitting wall to pass through said duct means and along the outer side of said second wall, and wherein said second wall defines an opening along its lower portion for allowing said air to enter said combustion chamber.

37. The radiant wall structure of claim 36, further comprising fresh makeup air means for delivering air outwardly away from said exterior radiant energy emitting surface of said radiant emitting wall and wherein said fresh makeup air means includes a duct spaced outwardly from said second wall and a portion of said duct passing through said second wall and said radiant emitting wall and defining a port spaced outwardly from said exterior radiant energy emitting surface of said radiant emitting wall.

38. The radiant wall structure of claim 37, wherein said fresh makeup air means includes blower means for delivering fresh air through said duct and said port and outwardly from said exterior radiant energy emitting surface of said radiant emitting wall.

39. The radiant wall structure of claim 38, wherein said blower means further comprises a centrifugal blower.

40. The radiant wall structure defined in claim 38, wherein said fresh makeup air means further comprises damper means to vary the quantity of air delivered by said fresh air duct means.

41. The radiant wall structure of claim 40, wherein said damper means further comprises a damper and a controller means connected to said damper to automatically control the actuation of said damper to vary the quantity of air delivered by said fresh air duct means.

* * * * *